UNITED STATES PATENT OFFICE.

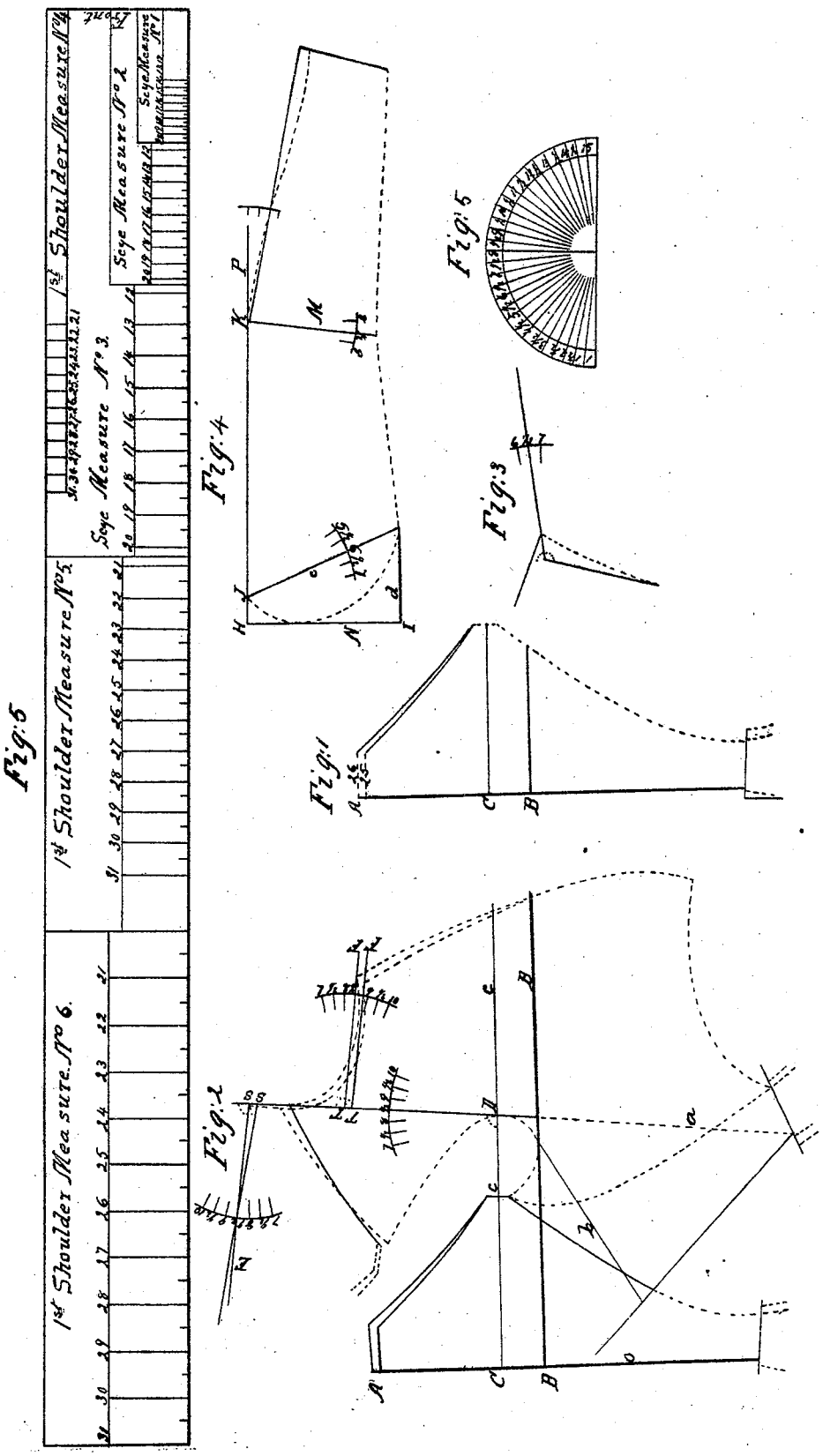
A. A. Bogardus.
Tailors' Measure.
No. 4294. Patented Nov. 29, 1845.

ABRAHAM A. BOGARDUS, OF NEWBURGH, NEW YORK.

TAILOR'S MEASURE.

Specification of Letters Patent No. 4,294, dated November 29, 1845.

*To all whom it may concern:*

Be it known that I, ABRAHAM A. BOGARDUS, of Newburgh, in the county of Orange and State of New York, have invented a new and useful Improvement in Tailors' Measures for Cutting Garments; and I do hereby declare that the following is a full, clear, and exact description thereof, reference being had to the accompanying drawing, which illustrates my plan.

In ordinary measures there is no rule by which all the proportional angles are taken that will fit any shaped man, where such rules are based upon the shoulder and breast measures, and it has long been attempted to form a system that should meet all the exigencies of the various shapes that come under the practice of the tailor, and fit equally a low or high shouldered man or other irregular form. My invention remedies all these difficulties, and by it a fit is always sure if the measures are taken with care.

In taking the measure of a person I make a mark at the nape of the neck above collar bone, at the back scye, at the center of the back opposite the back scye, at the hollow part of waist, at the length of the breast agreeable to mark at waist. I then place the end of the measure at the first of the above named marks and measure length of waist. Keeping the end of the measure at its place I measure around the scye up to the place of beginning which is the first shoulder measure; and I lower the measure until it comes square across to the back seam from under arm; and then I lower it to mark at the waist, which are the two balance measures; and then keeping the end of the measure at its place I measure the length of breast to mark in front. I then place the end of the measure on mark at the center of the back and measure around the arm or scye to place of beginning which is the second shoulder measure. From same place to mark at back scye I measure the width of back, at which last mark I measure the circumference of the scye.

In drafting the back I spring line (O) in at waist two inches. To get line (B.) from (A.) I apply scale of measures (see Fig. 5) (on which are different sizes of shoulder and scye measure), the scale No. 5 being one-third of the first shoulder measure deducting one inch gives the distance from (A.) to (B.) which is the line of the bottom of the scye. Scale No. 2 (which is one-half of the diameter of the scye deducting one inch), gives the distance from (B.) to (C), draw the lines (B) and (C) perpendicular to line (O.). On line (C) apply the measure for the width of the back. Then form the back scye, side and shoulder seam.

In drafting the forepart I draw the lines (B) and (C) on the cloth out of which it is to be cut and lay on the back as per draft. Scale No. 3. (which is the diameter of scye deducting one inch) gives the distance on line (C) from the back scye to the front of scye on the forepart, at which point I place the center of the protractor. This protractor is ten inches in diameter, and is laid off into half inches on its curve or in other words is divided into thirty equal parts. At the point of the scye I draw balance line (D) through 8¼, in all cases. Scale No. 6 (which is one-half of first shoulder measure) gives the distance from line (B) the bottom of scye to point (S) on balance line, at which last point I place the center of the protractor, and if the first and second shoulder measures are equal I draw a line (E) through 9; and if the first shoulder measure be one inch more than the second then I draw line (E) through 8½; and if the second shoulder measure be one inch more than the first then I draw line (E) through 9½, varying one-half inch on the protractor to one inch difference of the shoulder measures. On line (E) which is the center of the back lay the same and from the shoulder and scye. Scale No. 4 (which is one third of the distance from point (S) to the bottom of scye), gives the distance on the balance line from point (S) to point (T,) at which I place the protractor forward of the balance line and draw another line through 8½, by which I form the neck gorge. To balance the coat I pass the measure from point (S) through the balance line of the shoulder to the center of the waist, as at *a* Fig. 2, and from under the scye across the shoulder blade to the back seam as per draft at *b*, Fig. 2.

In laying out the sleeve I draw lines (P) and (N) at right angles (see Fig. 4.). Scale No. 1 (which is one fourth of the diameter of the scye one inch deducted) gives the distance from (H) to (J). I place the protractor at point (J) on line (P) and draw a line C, through 6. I measure from (H) to (I) one half of the circumference of the scye, at which last point I square a line *d* down to intersect the protractor line C, which gives the point of the fore arm seam. I then place the protractor at the elbow point which is found by measure on P at K and draw line through 2, for the crook of the sleeve, and through 8½ for line (M) across the sleeve.

Having thus fully described my improvement, what I claim as my invention and desire to secure by Letters Patent, is—

The combination of the above scale of subdivided measures and the protractor in the manner described, so that the angles for laying out any sized coat shall be given by the protractor from the points found by measuring the person to be fitted by means of the scale as herein set forth.

ABM. A. BOGARDUS.

Witnesses:
BENJN. TYLEN,
E. R. BOGARDUS.